United States Patent
Sandin et al.

[11] Patent Number: 5,471,468
[45] Date of Patent: Nov. 28, 1995

[54] SQUARE SWITCHING ARCHITECTURE

[75] Inventors: Rolf S. Sandin, Sollentuna; Per A. M. Ljungberg, Stockholm, both of Sweden

[73] Assignee: Telefonaktiebolaget LM Ericsson, Stockholm, Sweden

[21] Appl. No.: 67,012

[22] Filed: May 26, 1993

[30] Foreign Application Priority Data

Jun. 1, 1992 [SE] Sweden .................................. 9201697

[51] Int. Cl.6 .................................................. H04L 12/56
[52] U.S. Cl. .................. 370/60; 340/825.89; 340/825.79
[58] Field of Search ........................... 370/60, 60.1, 94.1, 370/94.2, 61, 94.3; 340/825.02, 825.75, 825.83, 825.85, 825.86, 825.89

[56] References Cited

U.S. PATENT DOCUMENTS

| | | | |
|---|---|---|---|
| 3,633,163 | 1/1972 | Birchmeier | 340/825.02 |
| 4,165,497 | 8/1979 | Irons | 340/825.02 |
| 4,470,139 | 9/1984 | Munter | 370/66 |
| 4,754,451 | 6/1988 | Eng et al. | 370/60 |
| 4,817,082 | 3/1989 | Orsic | 340/825.79 |
| 4,837,761 | 6/1989 | Isono et al. | 370/60 |
| 4,876,681 | 10/1989 | Hagiwara et al. | 370/60 |
| 4,935,922 | 6/1990 | Wicklund et al. | 370/60 |
| 4,970,507 | 11/1990 | Cooperman et al. | 340/825.79 |
| 5,046,064 | 9/1991 | Suzuki et al. | 370/60 |
| 5,278,548 | 1/1994 | Haber | 340/825.79 |

FOREIGN PATENT DOCUMENTS

| | | |
|---|---|---|
| 0320714 | 6/1989 | European Pat. Off. . |
| 0374574 | 6/1990 | European Pat. Off. . |
| 3742748 | 6/1989 | Germany . |

*Primary Examiner*—Wellington Chin
*Attorney, Agent, or Firm*—Burns, Doane, Swecker & Mathis

[57] ABSTRACT

A packet switch has a switching architecture comprising a cross network of input and output switching links crossing each other. The output switching links form a number of tree structures, which each includes an upper buffering level, which includes a number of intermediate storing buffers for packets entering on the input links, and a lower buffering level with at least one output buffer connected for reception of the contents in at least two of the intermediate storing buffers of the upper buffering level, and the output of which forms an output of its respective output switching link.

13 Claims, 4 Drawing Sheets

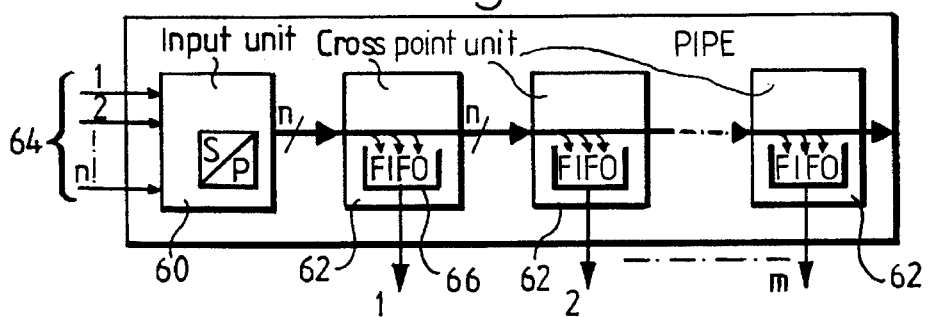
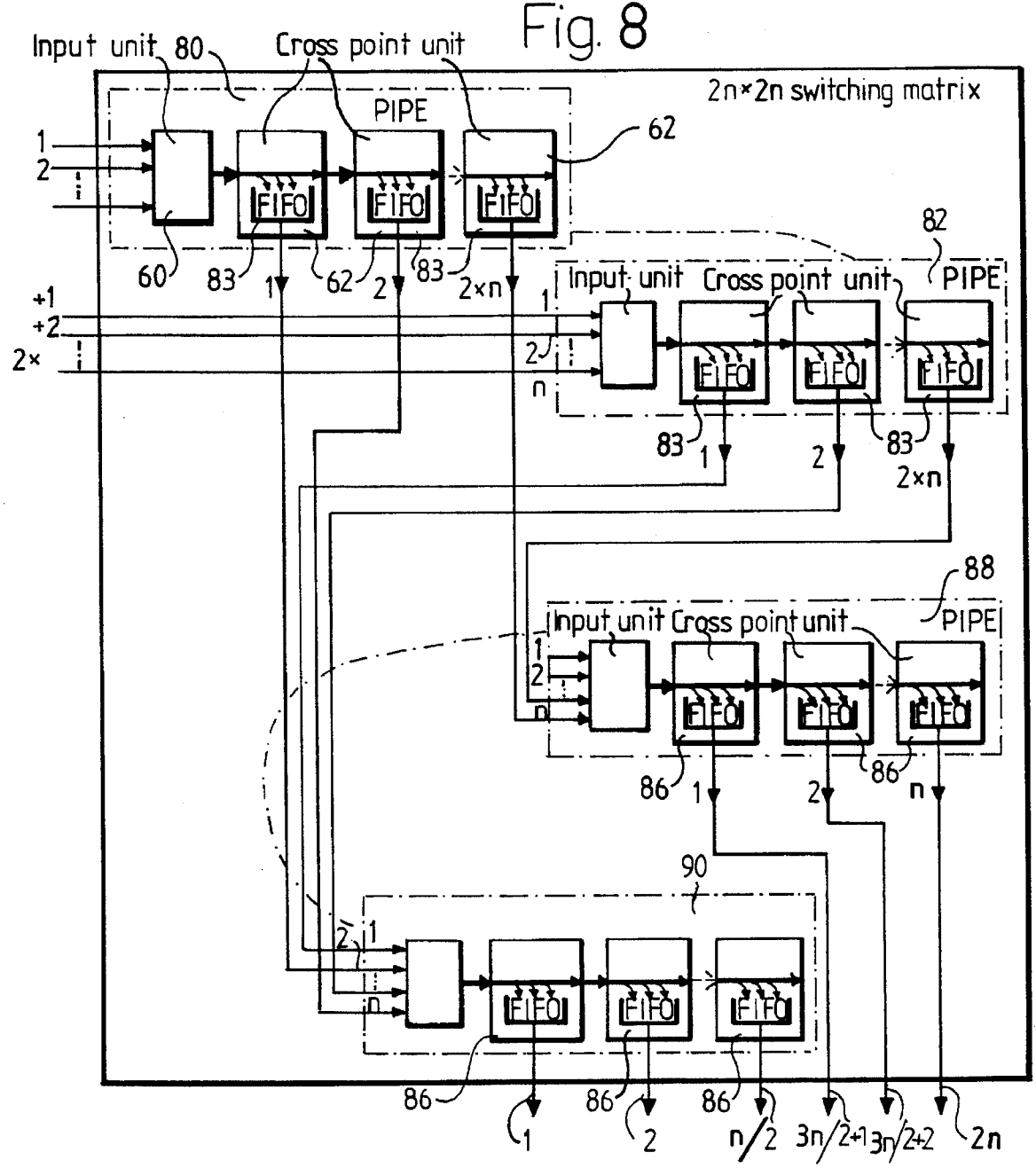

SQUARE SWITCHING ARCHITECTURE

BACKGROUND

The present invention relates to a packet switch with a switching architecture comprising a cross network of input- and output stitching links respectively crossing each other.

Below follows a survey of some practically existing or suggested architectures:

Square matrix

Common medium of ring or bus type

Single-path-network, e.g. Batcher-Banyan- or Delta-networks.

Multi-path-networks, e.g. Clos- or Benes-networks.

As far as large switches are concerned architectures which are not of square structure are foremost discussed internationally. A packet switch with a square matrix has, however, many desired properties. It is free of congestion, it admits simple routing and manages point to multi point connections. On the other hand it is difficult to expand as the amount of hardware grows in proportion to the square. It is also difficult in large matrixes to solve the problem of multiplexing traffic from the rows to the columns of the matrix. Proposals for solving this problem mostly imply that some form of control algorithm communicates towards the buffers of the cross points and thereby distributes the bandwidth of the column between the cross points.

Up to a maximum size a switch with a common medium has the same properties as the square one. It has, however, a limited size as the common medium shall carry the sum of bandwidths connected to the switch. It is therefore not suitable for a large broadband packet switch.

A switch consisting of a single-path-network has the property that two packets can desire to reserve an internal link in the network simultaneously. As there is no buffering in the network one of the packets therefore has to be eliminated (a form of internal lock).

To prevent this there must be complicated algorithms for selection and sorting of the packets. There is so far no good and simple solution to this problem.

In some cases a multi-path-network is an extension of single-path-networks for solving the problem described above.

These networks can be dimensioned to decrease the internal congestion and, as far as CLOS-networks are concerned, also be dimensioned free of congestion. As the name indicates there are several alternative routes through the switching network to one and the same output. Thus the routing algorithm becomes considerably more complex than for the single-path-networks.

Through U.S. Pat. No. 4,876,681 a packet switch is known, which has a network configuration aiming at enabling network expansion and change of configuration.

The switch includes a number of "configuration units" connected in a hierarchical tree structure, where the number of hierarchical steps or levels can be selected according to the size of the network.

In the respective configuration units of the tree structure a fifo buffer is arranged. The packet transfers to the next step of the hierarchical tree structure are made in dependence of supervision of the state of the fifo buffer in said next step. If the fifo buffer in the next step is not empty the packet data is kept in the own internal fifo buffer.

SUMMARY

The object of the invention is to provide a switching architecture, which in a simple way and to a reasonable cost admits the design of large as well as small packet switches.

This object has been achieved by a switch in which the output switching links form a number of tree structures, each comprising an upper buffering level including a number of intermediate storing buffers for packets entering on the input links, and a lower buffering level with at least one output buffer, which is connected for reception of the content in at least two of the intermediate storing buffers of the upper buffering level, and the output of which forms an output of the output link in question.

According to one embodiment the connection between said output buffer and the intermediate storing buffers of the upper buffering level can pass via one or several intermediate levels with further intermediate storing buffers.

According to one advantageous further embodiment the buffers of the upper buffering level can be connected each for receiving packets intended for each of at least two output links, a corresponding number of output buffers being arranged in a demultiplexing unit for these output links.

According to a preferable and very advantageous further embodiment the functions of the switch are distributed among two types of a number of functional units, viz., on the one hand, an input unit with functions for converting serial bitstreams to parallel formats, recreating the phase position of the bitstream from the input links, and recovering packet limits and adjusting the phase positions of these so that they will land on complete words in the following buffers, and, on the other hand, a cross point unit including a storing buffer.

Said functional units can be utilized in the packet switch so that the latter comprises a number of input link and output link units with each an input unit and a number of following cross point units, arranged in series, said storing buffers of the input link units forming the upper buffer level intermediate storing buffers, and said storing buffers of the output link units forming the lower buffer level output buffers.

DESCRIPTION OF THE FIGURES

The invention will now be described in detail with reference to the enclosed drawings, on which FIGS. 1 and 2 schematically illustrate the design of two conventional square switching matrixes, FIG. 7 shows the implementation of a basic block, designated to be used at the realization of a practical implementation of a switching matrix according to the invention, and FIG. 8 and 9 show the design of two embodiments of a switching architecture by means of basic blocks according to FIG. 7.

DETAILED DESCRIPTION

Figure 1:
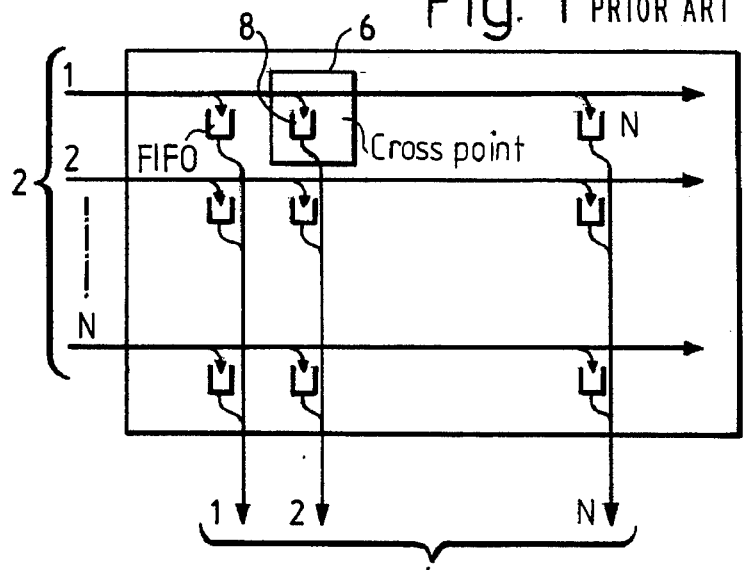
Figure 2:
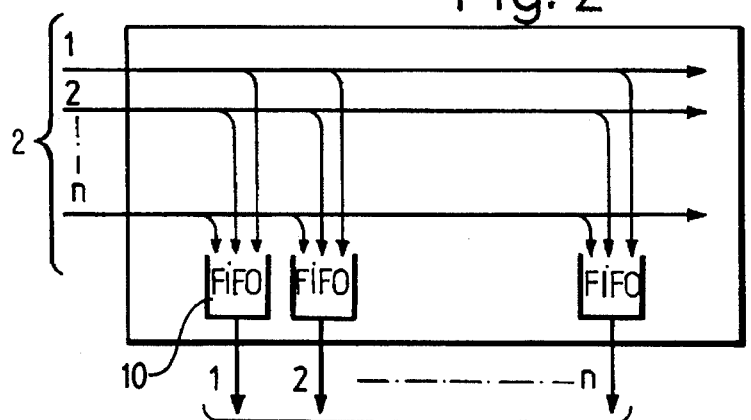

A more detailed description of the background of the invention will now first follow with reference to FIGS. 1 and 2.

A conventionally designed switching matrix for a packet switch can have the appearance shown in FIG. 1. The matrix has N input rows 2 and N output columns 4. Thereby N*N cross points are achieved, of which one has been indicated at 6.

The matrix should realize a Space switching function, i.e. packets entering the matrix on an arbitrary row should be guided out on one or several arbitrary columns. In each cross point 6 there is therefore some form of intelligence, typically an address interpreter, which translates the addresses of the packets to a decision with respect to whether the packet should be guided out or not.

There is furthermore an intermediate storing buffer 8, which stores packets waiting for the output to be unoccupied. The object of this is to resolve the contention problem, i.e. the problem with packets from several rows which should be guided simultaneously to the column and thus "compete" about the column as a resource. These buffers are realized with commercially available semiconductor memories in the form of RAM:s (Random Access Memory), organized as fifos (First In First Out).

A problem which must be solved for broadband applications of the kind intended in the present case, is the limited ability of a RAM to swallow bandwidth. A RAM having a width of one bit of a word can only manage a limited bandwidth for a given technology. The technology available today admits perhaps up to 100 Mbit/s. It can therefore be stated that a RAM has a certain bandwidth limitation per bit width of a word.

The weakness of these type of matrixes is therefore that they grow in proportion to the square (N*N) which requires a large amount of hardware for large switches. At the same time it is very difficult to solve the problem of multiplexing the packets from the rows out to a column for a large number of rows (for a given technology the number of rows which can be multiplexed to a column is limited).

The first step to increase the capacity of a RAM is therefore to increase the number of bits in parallel, so that the buffers of a column can be brought together to a common fifo buffer 10 according to what is shown in FIG. 2. The multiplexing is then done towards this common buffer.

There is, however, even for this a form of a practical limitation, since when the number of bits in parallel is approaching 100–200, the words start to become so wide that they are unmanageable. This provides problems with very wide buses, which are difficult to lay out on a circuit board etc. For ATM there is besides a limitation in that a so called ATM cell comprises 424 bits, which implies that it is fundamentally impossible to have a larger width than that of a word in the buffers included in the switching matrix. With technology available today it is approximately possible to multiplex 16, 32, or up to 64 rows toward a buffer.

Figure 3:
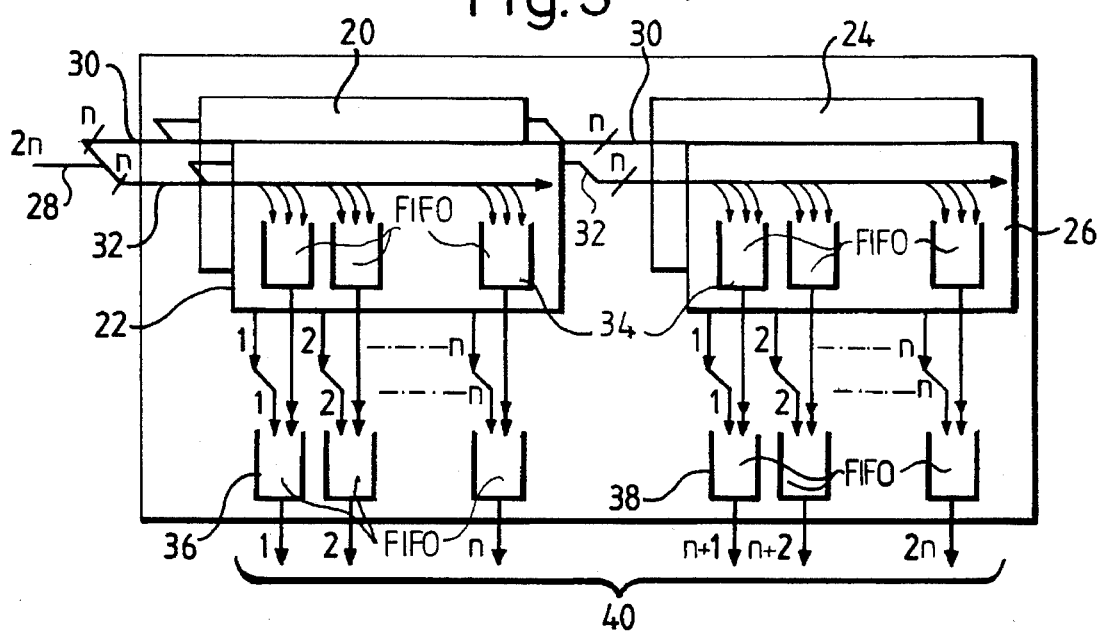
FIG. 3 shows a circuit diagram of a packet switch designed according to the invention.

According to the invention the problems mentioned above have been solved in a way, which is schematically illustrated in FIG. 3.

The matrix shown in FIG. 3 is composed of a number of matrix modules which are fundamentally of the design shown in FIG. 2. Four of the matrix modules are indicated at 20, 22, 24 and 26, respectively. The matrix has a total of 2n inputs, indicated with a common line 28. Each matrix module has n rows, the matrix modules 20 and 24 sharing the same n rows, as indicated with a common line 30, and the matrix modules 22 and 26 sharing the same n rows, as indicated with a common line 32.

In the same way as in FIG. 2 the n respective rows of each matrix module 20, 22, 24, 26 are multiplexed toward n common fifo buffers 34, the respective outputs of which correspond to each one of n columns of each matrix module. (In FIG. 3 the buffers 34 of the matrix modules 20 and 24 are not visible).

In the matrix modules 20 and 22 column buffers 34 with the same column number are multiplexed (thus, in this case in pairs) towards a common fifo buffer 36 of a following node. The same is valid for the matrix modules 24 and 26, the column buffers 34 of which having the same column number are multiplexed towards a common fifo buffer 38. The outputs of the altogether 2n fifo buffers 36 and 38 form the output columns 40 of the composed matrix shown in FIG. 3.

From FIG. 3 together with the above description it appears that each column in the composed matrix forms a tree structure where the 2n rows 30 and 32 are multiplexed towards a fifo buffer 34 in the leaves of the tree and that all rows are evenly distributed among the leaves of the column tree. The fifo buffer 34 of the leaf is then emptied with a constant bandwidth down into the fifo buffer 36, 38 of the next node, several leaves being emptied towards this buffer so that the structure gets thinner towards the root of the tree.

Figure 4:
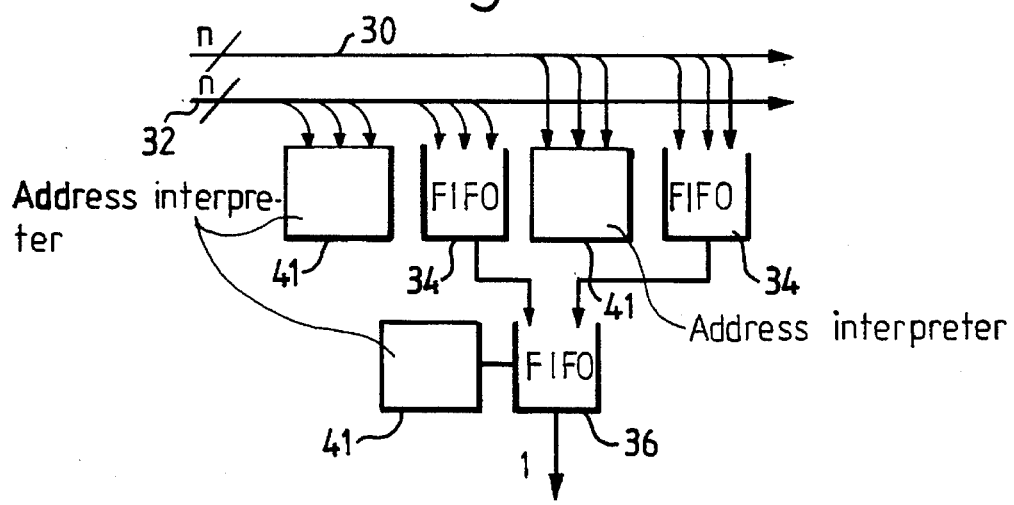
FIG. 4 shows a detail of the switch according to FIG. 3, illustrating the tree structure of one of the columns of the switch.

With reference to FIG. 4, which shows the first column of the matrix in a further schematized form, the leaf buffers 34 of both the matrix module 20 and the matrix module 22 being visible, also the space switching will be illustrated here. The space switching is done by assigning to each packet entering the switching matrix a kind of label, which indicates the column or columns, to which the packet should be transmitted. The label thus constitutes a direct address to a column. The columns are configured such that they get a physical address from zero up to the number of columns of the matrix. Each unit has knowledge of the column to which a buffer belongs, and thereby the situation can be regarded as if each buffer has an address, even if it shares this address with all buffers in the same column.

Address decoding is effected in each buffer stage through the column tree down to the root, and is done by an address interpreter 41 comparing the address of the packet against the address identity of its column. If the address of the packets is the same as the address of the column, the packets will be copied into the buffer, and in the opposite case no copying is done.

One of the conditions for a switching matrix of the kind here indicated is that the bandwidth of a column should be as large as the bandwidth of a row. The bandwidth requirement in the buffer structure is thereby caused foremost by the varying burst density in the arrivals of traffic to the first buffer stage 34. By this is meant that there can arrive packets on several rows simultaneously, which should be guided towards the same column, while in between there can appear intervals without packets to this buffer. To..cope with this the first buffer stage must be able to manage the sum of the bandwidths of the number of connected rows. In a practical case this bandwidth can be of an order of magnitude of 200 Mbit/s per row.

The suggested tree structure is implemented with a leaf buffer, which aided by the best technology is able to manage the largest possible bandwidth and thereby allows the connection of n rows. When this is not enough for large switching matrixes the number of rows is distributed over more leaf buffers in a tree structure. (Per se, it is, however, normally desirable to limit the number of buffer stages in the column).

As it is known that the bandwidth out from a root buffer of a column never is larger than the bandwidth of a row, the bandwidth out from a leaf buffer will neither never be larger than on a row. It could therefore be said that the traffic in the leaf buffer of the tree has been concentrated by filtering out, by means of the addressing mechanism, the traffic (packets), which should not be guided to this column. Thereby the bandwidth towards the root buffer has been concentrated a factor n, and if the root buffer is implemented according to the same principle as the leaf buffer, the tree can be expanded to comprise n leaf buffers and thereby n,n rows before further buffer stages must be introduced.

Figure 5:
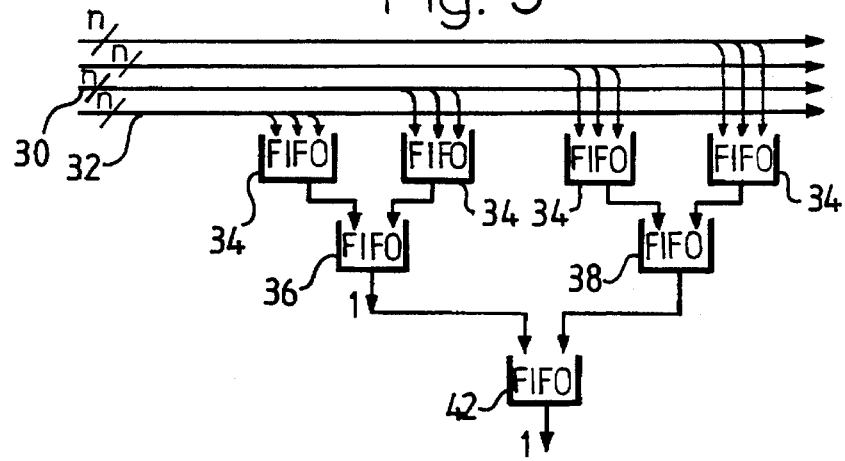
FIGS. 5 and 6 illustrate further developments of the tree structure according to FIG. 3.

With reference to FIG. 5, which illustrates one of the tree structures of a further development of the matrix according to FIG. 3, fifo buffers 34 with the same column number are also emptied with a constant bandwidth to the next buffer (node) 36 and 38, respectively, and so on down to the root of the tree, the fifo buffer of which is here designated 42. The root of the tree corresponds to the output of the column out from the matrix. In this way indefinitely large matrixes can, basically, be created by the trees of the columns being expanded with a suitable number of nodes.

From FIG. 5 it also appears how the tree in the column is expanded depending upon the number of rows which are included in the matrix. The two lowest row lines 30, 32 are the same as in FIG. 3.

For a given application of the packet switch there are requirements on a specified bandwidth for each row and column in the matrix. It is then easy to understand that it is an advantage to carry out the space switching in the matrix on a larger bandwidth than that on a row and a column, respectively. This is done in combination with a demultiplexing of the larger bandwidth at the output (the root). This depends upon the fact that the number of leaves grows in proportion to the square in the matrix while the demultiplexing gives a linear growth of the number of fifos in the root of the tree. The result is a tree structure according to FIG. 6.

Figure 6:
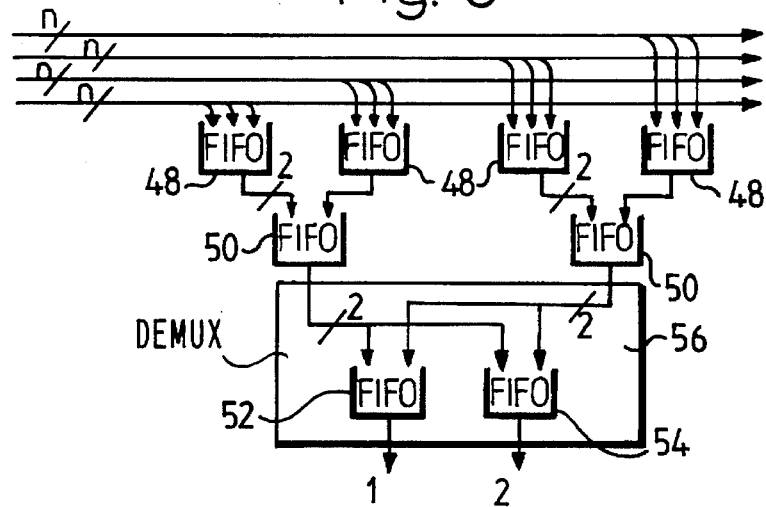

In FIG. 6 the bandwidth between the leaf buffers 48, which correspond to the buffers 34 in FIG. 4, and the node buffers 50, which generally correspond to the buffers 36, 38 in FIG. 5, is a factor two larger than the bandwidth on the rows of the matrix and the output of the column. In other words, the traffic of two columns is emptied into each buffer 48. This implies that the leaves and nodes of two columns can be coordinated in one and the same tree (by the space switching being made on a higher "level"). On the other hand, the root of the tree must be completed with fifo buffers 52 and 54, respectively, for each column belonging to the tree, i.e. the root must include a demultiplexing function, designated 56.

In an implementation of a square switching matrix according to the structure, which has been shown schematically in the earlier sections, there is a great need for connections at physical level. All rows should be distributed to all cross points in a row and the columns should collect all cross points in a column. This together with the requirement that each row and column in a broadband switch should carry the highest possible serial bandwidth, creates a great need for good transmission properties.

A functional partition of the functions of the matrix into two implementation units provides these good properties. With reference to FIG. 7, the functions can be shared among an input unit 60 and a cross point unit 62. The input unit 60 manages and terminates serial bit streams entering on the rows 64 and converts these to a simpler parallel format, as seen from the point of view of transmission ability. The cross point unit 62 performs space switching and buffers the packets in fifo 66 in the cross point. It is connected to the input unit via the parallel interface. These two units together form a structure according to FIG. 7, here called "Pipe".

The Pipe outlined in FIG. 7 is a basic block, which can be used at the implementation of the switching matrix. Into the Pipe serial bit streams are connected to the input unit 60. It is possible to connect up to n bit streams which are converted to parallel format and are further transmitted out to a parallel interface towards the first cross point unit 62. The parallel connection between two cross point units can be of the type point to point, which implies that a cross point unit is an active part of the connection, i.e. the parallel connection enters into and through the cross point unit. Each cross point unit can include an amplifying function. In such a way very good transmission properties can be achieved on the connection between two cross point units 62.

The size or length of the Pipe can be varied by providing it with an arbitrary number of cross point units 62, by which the number of outputs, m in the Figure, can be varied arbitrarily.

By making the Pipe unit with an input unit and a cross point unit many advantages are achieved considering the great need for bandwidth on rows and columns (by order of magnitude of 200 Mbit/s and more). At bandwidths of this size special solutions are required for designing synchronous system.

A problem is that the propagation time of a data signal from transmitter to receiver even for short transmission paths rather soon exceeds the pulse width of a data bit. Therefore it is required that the receiver can recover the phase position of the data signal with respect to a reference clock in the synchronous system.

Further the phase position of the packets (ATM-cells) must be recovered, which is in turn dependent on the packets being buffered as a whole number of words in the RAM-based buffers. These two functions are relatively expensive to implement, foremost with respect to power consumption and silicon area. It is therefore an advantage if they can be broken out as a common part for several units, which has been done with the Pipe-unit shown in FIG. 7.

Thus, the input unit 60 comprises functions for recovering, on the one hand, the phase position of the data stream from the n connections, and for recovering, on the other hand, the packet limits and adjusting the phase positions of these so that they get into complete words in the following buffers, when the packet limit is reached. This can be made in a manner well known by one of ordinary skill in the art. A requirement for it to provide any advantage is that the successive interfaces are "simple" from a transmission point of view and that they will not destroy the recovered phase position. This is likewise achieved with the unit shown in FIG. 7. Since the input unit 60 and the cross point units 62 are located on the same circuit board they can be placed in a row, and thus, the distance circuit to circuit becomes very short with good transmission properties.

The principle of providing a tree structure for a 2n*2n switching matrix with six Pipe-units appears from FIG. 8, only four of these units being shown in the Figure. The division into Pipe-units is primarily determined by the manner of design to be used, e.g. the size of the circuit board decides the number of input and cross point units 60 and 62, respectively, for which there is room on the circuit board. The Figure describes an ideal relationship when a maximum number of inputs and outputs of the Pipe-unit limits its size.

More particularly, the 2n rows and the 2n columns have been distributed so that the number of rows has been distributed among two Pipe-units 80 and 82, respectively. Each of these two units connects n of the rows of the matrix and comprises 2n of the leaf buffers of the matrix. As a total there are thus 4n leaf buffers in the switching matrix.

Thus, a column tree consists of a leaf buffer 83 from each of the Pipe-units 80 and 82, respectively, and of one root buffer 86 of each of four column collecting Pipe-units, of which only two are shown, viz. 88 and 90. These column collecting units can as a maximum provide n/2 root buffers, due to the maximum of n inputs to the Pipe-unit.

Figure 9:
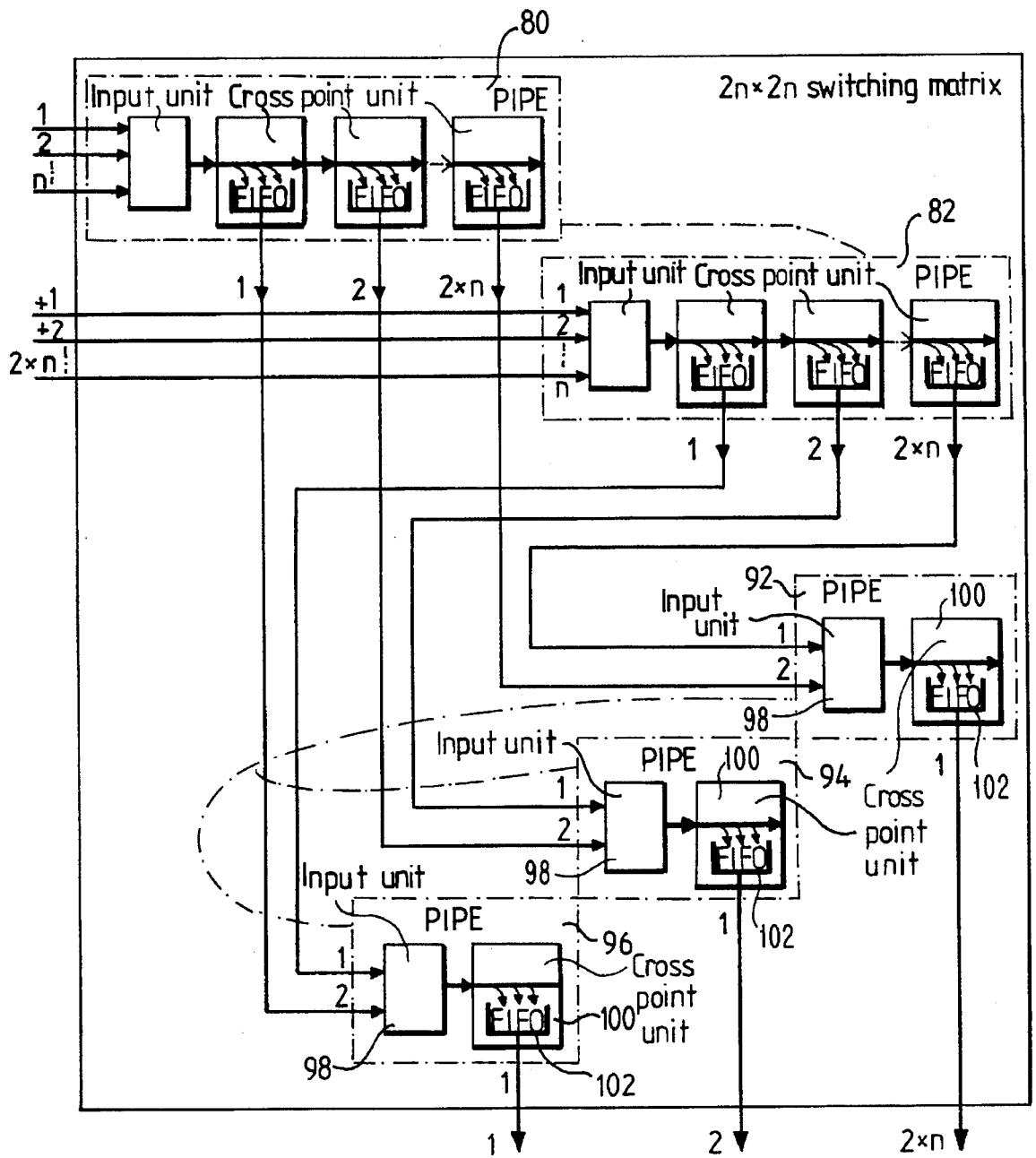

In FIG. 9 an embodiment alternative to that of FIG. 8 is shown, which is different from the latter only by each column tree of the matrix being formed by a short Pipe-unit. Only three column trees are shown at 92, 94 and 96, respectively. These short units consist each of an input unit 98 and a cross point unit 100 with a root buffer 102. Also nodes, if any, in the tree can be provided by using a short Pipe-unit for each. If the bandwidth of the bit streams from the leaf buffers is larger than the bandwidth out from the root, a demultiplexing function, of the kind which has been described above with reference to FIG. 6, is implemented in the short Pipe.

To sum up, rows and cross points of a matrix can be implemented with a number of long Pipe-units, which include the leaf buffers. The length of such a Pipe is the same as the number of rows in the matrix or less dependent on whether the bandwidth between the leaf and the root of the column tree is larger than the bandwidth of a row or the bandwidth out from the root of the column tree. The root and possible nodes in the tree are implemented in a short Pipe, which connects serial bit streams from the fifo buffers of the leaves. If the bandwidth of the bit streams from the leaves is larger than the bandwidth out from the root, a demultiplexing function is also implemented in the short Pipe. As the address decoding is also made at the root of the tree it is possible to implement several root buffers in the same Pipe-unit. If the unit only utilizes one root buffer no decoding of the address of the packets needs to be done in this stage, but detection is only done with respect to whether there is a packet present, which in such case is copied into the buffer.

With this arbitrary Pipe a switch matrix with a modular design is achieved which can be expanded to an arbitrary size. Besides the functionality can be implemented with the aid of two implementation units which is the same as two types of integrated circuits.

By the invention a switch is provided which is, for example, suitable for packets according to the ATM-standard (Asynchronous Transfer Mode). The architecture is free of congestion, expandable, resolves contention and manages multipoint connections. Besides it can utilize the development of the technology in a flexible and efficient way.

These properties make the architecture very suitable for the realization of a general ATM-switch for Broadband Integrated Services Digital Networks (B-ISDN).

What is claimed is:

1. A packet switch with a switching architecture comprising:
    a cross network of input and output switching links crossing each other; and
    a number of tree structures connected to said output switching links, said number of tree structures including an upper buffering level containing a number of intermediate storing buffers for packets entering on said input links, and a lower buffering level with at least one output buffer connected for receiving the contents of at least two of said intermediate storing buffers of said upper buffering level, the output buffer having an output provided to its respective output switching link.

2. A packet switch according to claim 1, wherein said output buffer is connected to said intermediate storing buffers of said upper buffering level via at least one intermediate level having further intermediate storing buffers.

3. A packet switch according to claim 2, wherein said intermediate storing buffers of said upper buffering level are each connected for receiving packets intended for each of at least two output switching links, and a corresponding number of output buffers are provided in a demultiplexing unit for these output switching links.

4. A packet switch according to claim 2, wherein the input switching links are distributed among inputs of at least two matrix modules arranged in parallel, each matrix module having an output corresponding to an output switching link and including an intermediate buffer on said upper buffering level to which all input switching links connected to each matrix module are connected in common, said intermediate buffers in the matrix modules having outputs that are associated with the matrix module outputs corresponding to respective output switching links and that are connected to a common further buffer.

5. A packet switch according to claim 4, wherein the common further buffer has an output connected to a common output buffer of the switch for each output of the switch.

6. A packet switch according to claim 2, comprising a number of functional units, each functional unit comprising one of a cross point unit including a storing buffer and an input unit for terminating serial bit streams and converting the streams' format to a predetermined internal format used for transmission between said input unit and one or more cross points.

7. A packet switch according to claim 1, wherein said intermediate storing buffers of said upper buffering level are each connected for receiving packets intended for each of at least two output switching links, and a corresponding number of output buffers are provided in a demultiplexing unit for these output switching links.

8. A packet switch according to claim 1, wherein the input switching links are distributed among inputs of at least two matrix modules arranged in parallel, each matrix module having an output corresponding to an output switching link and including an intermediate buffer on said upper buffering level to which all input switching links connected to each matrix module are connected in common, said intermediate buffers in the matrix modules having outputs that are associated with the matrix module outputs corresponding to respective output switching links and that are connected to a common further buffer.

9. A packet switch according to claim 8, wherein the common further buffer has an output connected to a common output buffer of the switch for each output of the switch.

10. A packet switch according to claim 1, comprising a number of functional units, each functional unit comprising one of a cross point unit including a storing buffer and an input unit for terminating serial bit streams and converting the streams' format to a predetermined internal format used for transmission between said input unit and one or more cross points.

11. A packet switch according to claim 10, comprising a number of input and output link units each with an input unit and a number of cross point units following thereafter in series, said input link units including storing buffers forming said upper buffer level intermediate storing buffers, and said output link units including storing buffers forming said lower buffer level output buffers.

12. A packet switch with a switching architecture comprising:

a cross network of input and output switching links crossing each other; and two types of a plurality of functional units for distributing the switching functions of the switch, the first type of functional unit being a cross point unit having a storing buffer and the second type of functional unit being an input unit for terminating serial bit streams and converting an external format of the serial bit streams to an internal format, the internal format having transmission properties that differ from transmission properties of the external format, and bit streams having the internal format are communicated between the input unit and at least one cross point unit.

13. A packet switch according to claim 12, further comprising a plurality of input link units and a plurality of output link units, each having an input unit connected to a plurality of cross point units, wherein the storing buffers of the cross point units of the input link units form upper buffer level intermediate storing buffers, and the storing buffers of the cross point units of the output link units form lower buffer level output buffers.

* * * * *